Aug. 29, 1933.  E. D. PHINNEY  1,924,413
SPEEDOMETER
Filed June 27, 1931
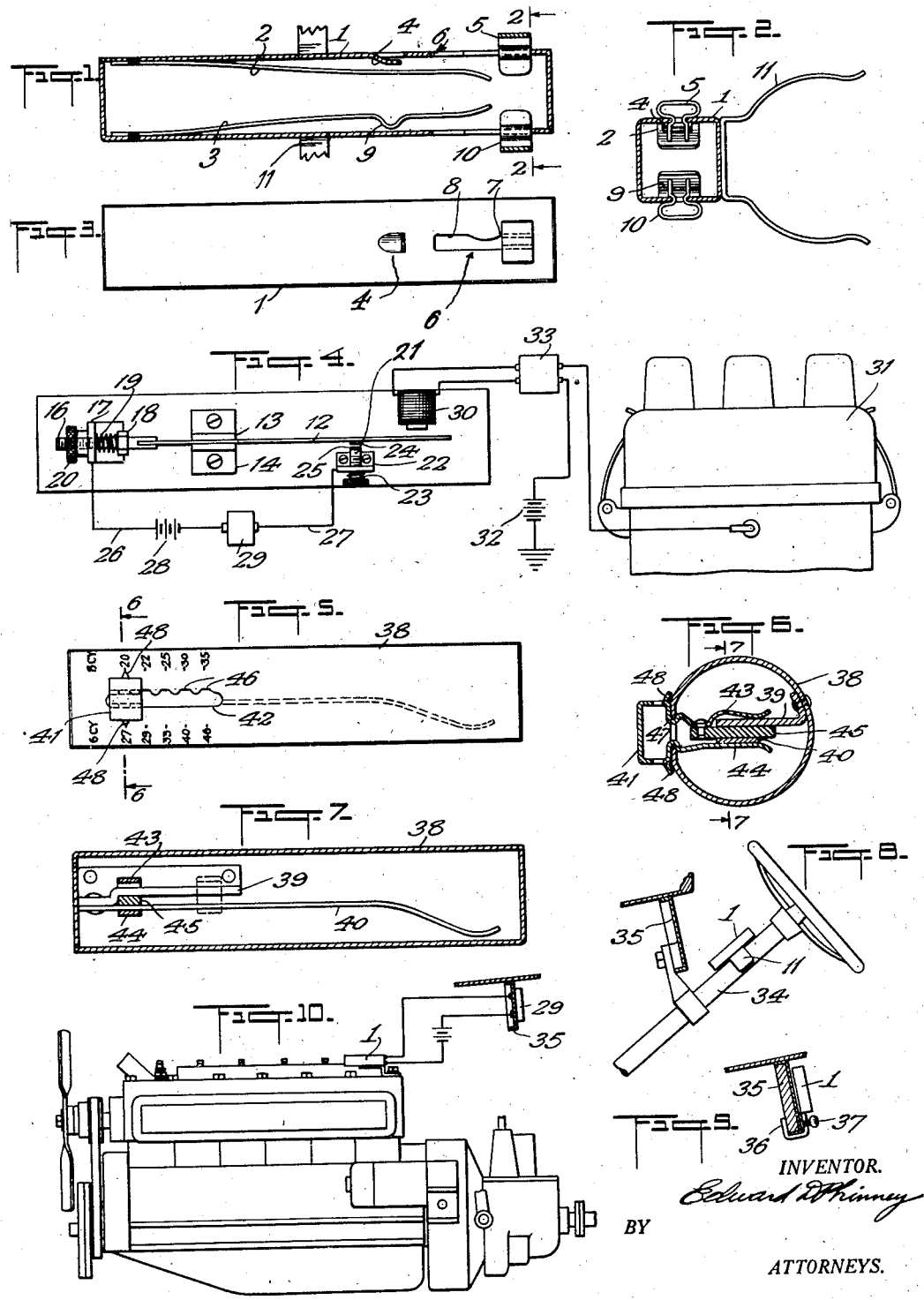
INVENTOR.
Edward D Phinney
BY
ATTORNEYS.

Patented Aug. 29, 1933

1,924,413

UNITED STATES PATENT OFFICE 1,924,413

SPEEDOMETER

Edward D. Phinney, Mount Vernon, N. Y.

Application June 27, 1931. Serial No. 547,440

6 Claims. (Cl. 116—74)

This invention relates to speedometers for automobiles.

It is an object of my invention to provide an automobile speedometer operating on the vibrating reed principle, which is cheap to construct, accurate, and easy to install.

More specifically it is an object of my invention to provide a speed indicating device for automobiles or other vehicles, which is adapted to give an audible signal at predetermined speeds and which does not require driving connections to the propeller shaft or wheels of the vehicle.

In accordance with my invention, I provide a vibratile reed and an anvil or sounder therefor so located with respect to the reed as to be struck thereby during vibration of the reed at its natural frequency and at a predetermined amplitude. A plurality of reeds may be provided, each one of which is adapted to vibrate at a different frequency, and the anvils for each reed may be either in the form of a plain abutment or some sound creating device such as a bell. Where several reeds are used, the bells or other sounding devices may be adapted to produce different tones so that a different tone will be created for the vibration of each different reed. Where the speedometer device is used on an automobile, the vibrating reed unit should be mounted so as to be under the influence of the engine vibrations. The unit may be mounted on the dashboard of the car, the steering column, or the gear shift lever, thereof. Preferably, the reeds are mounted to vibrate laterally so as not to be influenced by road shock. To this end, the reeds may be mounted vertically, or where they are made of flat stock to vibrate in a single plane, they may be mounted horizontally or any other position provided vibration takes place laterally of the car. In order that any desired one of the speed indicating reeds may be used to the exclusion of the others, I provide means for locking the undesired reeds against vibration. If the engine vibrations are not transmitted sufficiently to the dashboard or steering column of the car to actuate the reeds, or if it is otherwise desirable, the reed unit may be mounted directly on the engine block and be furnished with electric contacts so that an electric signal device, such as a tapper bell or light, may be remotely controlled thereby. This signal device may be mounted on the dashboard of the car or in any other position so as to be under observation of the driver. Bells of different tones or the lamps, of different colors may serve to indicate different speeds.

A speedometer constructed in accordance with this invention is particularly useful in connection with automobiles, but might be used on motor boats, airplanes, or other vehicles as well.

The device is advantageous as a warning device in conjunction with new automobiles, which are supposed to be operated at low engine speeds for the first few hundred miles. By attaching to the dashboard or steering column of the car, a single reed device, selected to vibrate at the maximum permissible car speed, the driver will be warned if he passes through the maximum speed. For example, the reed may be set to operate at an engine speed corresponding to a high gear road speed of twenty-five miles per hour and will give an audible warning, in the nature of a buzzing sound, when that speed is reached. As the speedometer is dependent solely on engine speed, it will also give a warning even if the car is in second, or low speed, when the engine revolution exceeds that number corresponding to the maximum high gear road speed, e. g., twenty-five miles per hour.

If the anvil is positioned relatively far away from the reed so that it will be struck by it only when vibrating at its maximum tuned frequency amplitude, the instrument will be extremely accurate and sharp in response. But by placing the anvil nearer the reed a broader response will be obtained. When this is done the device will begin to sound a warning before the predetermined frequency of vibration is reached and will continue to do so after that frequency is passed. For example, a tuned reed with the anvil widely spaced may respond sharply between 25 to 25.5 miles per hour, car speed, and be entirely silent at all other speeds. But if the anvil is moved closer to the reed the device may respond at from 24 to 26.5 miles per hour. By arranging the reed and anvil for a broad response, it is insured that a warning will be given even if the car is quickly accelerated up to and past the warning speed.

Instead of using a plurality of reeds to indicate different speeds a single one may be provided, and means furnished to vary its effective length, or weight. By such means the reed could be set to respond at any desired speed.

The invention will be more full explained in the following detailed description taken in conjunction with the accompanying drawing.

In the drawing, Fig. 1 is a sectional view of a device constructed in accordance with my invention.

Fig. 2 is a sectional view along line 2—2 of Fig. 1.

Fig. 3 is a side elevation view of the device shown in Fig. 1.

Fig. 4 is a diagrammatic view showing a modified form of my invention and the accompanying circuit connections.

Fig. 5 is a plan view of a form of an adjustable vibration responsive device.

Fig. 6 is a sectional view taken along line 6—6 of Fig. 5.

Fig. 7 is a sectional view taken along line 7—7 of Fig. 6.

Figs. 8, 9 and 10 are views showing different positions in which the measuring device may be placed when in use.

Referring more particularly to the drawing, reference numeral 1, Figs. 1, 2 and 3, indicates a tubular housing preferably of sheet metal. 2 and 3 indicate respectively vibratile reeds of spring steel, phosphor bronze or the like, fixed to the inside of housing 1 by spot welding, riveting or in any other suitable manner. The reed 2 may be adapted to vibrate at one frequency, and 3 at a different frequency whereby two different indications are given. The reed 2 is provided with an anvil 4 in the form of a finger struck up from the side of the housing 1, or attached thereto and the spacing between the reed and the finger 4 is such that upon vibration of the reed at its fundamental frequency, it just touches the anvil sufficiently to produce a buzzing sound. The housing 1 acts as a sounding board and serves to amplify this sound somewhat.

In order to prevent the reed from vibrating when it is desired for the device to be silent, a stop 5 is furnished. This stop consists of a piece of resilient metal bent in a roughly U-shaped form as shown most clearly in Fig. 2, and fitted within a slot 6 in the side of housing 1. The legs of the U-shaped stop are adapted to move away from each other due to the resiliency of the metal and so press firmly against the sides of the slot 6. The slot has at one end a notch 7 and at the other end a notch 8, into which one leg of the stop fits, thereby preventing unintentional displacement thereof. When the stop is pushed into notch 8, it engages the end of reed 2 and holds it against vibration, out of contact with the anvil 4.

The reed 3 is bent to form a projection at 9 which approaches closely to the side of the housing 1. This bent projection on the reed avoids the necessity of having a struck-up finger such as 4. The side of the casing adjacent to projection 9 forms the necessary anvil. An adjustable stop 10, similar to 5, is furnished for rendering the reed 3 inoperative.

The entire device may be held in position, for example on the steering column of an automobile, by means of a clip 11, formed of spring metal, which is spot welded or otherwise attached to the housing 1, and which is adapted resiliently to grip the steering column.

The vibrating reeds may be made adjustable as shown in Fig. 4 in order to respond to any desired frequency. In Fig. 4 12 indicates the vibratile reed which is slidably positioned between a pair of guides 13 and 14 fixed to the base plate 15. The end of the reed 12 has fixed to it a screw 16 which passes through a hole in an abutment member 17. A nut 18 is fixed to the screw, and between the nut and the abutment is located a compression spring 19. A knurled adjusting nut 20 is provided for moving the screw and the reed affixed thereto, longitudinally against the compression of spring 19. By turning the nut 20 the effective length of the reed 12 from the guides 13 and 14 to the end thereof may be varied, with a resulting alteration in the natural period of vibration of the reed. An adjustable screw 21 supported by angle member 22 constitutes the anvil of the device. A compression spring 23 serves to prevent unintentional turning of the screw 21. In some cases it may be advantageous to furnish the reed with an electric contact 24 and the screw with a cooperating contact 25, in which event the reed should be insulated from the angle member 22, for example, by making the base of insulating material. By means of wires 26 and 27, the reed 12 and adjusting screw 21 are connected in series with a source of electrical energy 28 and an indicator 29. The indicator may either be an audible device such as a bell, or may be some visible indicator such as a light or annunciator. By properly adjusting the spacing between the end of screw 21 and reed 12, the indicator 29 will be caused to respond only when the reed is vibrating at a relatively high amplitude corresponding to its fundamental frequencies.

Instead of relying directly upon mechanical vibrations, electrical means may be furnished for vibrating the reed. This can be accomplished by making the reed 12 of magnetic material and positioning in magnetic relation thereto, a magnet 30 which is adapted to be energized periodically. Where the device is to be used as an automobile speedometer the magnet 30 may be interconnected with the primary energy circuit of the engine so as to be controlled by the breaker points thereof. The engine distributor, which usually carries the breaker points, is indicated by 31 and the current supply by 32. For insuring a sharp and accurate response, a transformer 33 may be provided, the primary of which is connected in series with the engine breaker points and the secondary of which is connected in series with magnet 30. With this transformer in circuit only spaced electrical impulses of extremely short duration will pass through the magnet 30. The opening and closing cycle of the breaker points will then not be important as a strong induced energizing current will pass through the magnet 30 only upon the opening of the breaker points.

In Figs. 5, 6 and 7, reference numeral 38 indicates a tubular housing having an angular member 39 secured to the inside thereof, e. g. by spot welding, or riveting. This angle member has a vibratile reed 40 fixed thereto. In order to vary the periodicity of vibration of the reed, a clip 41 is positioned in slot 42 located in the housing 38. This clip, which is roughly U-shaped, has a pair of spring legs 43 and 44 which normally tend to spread apart due to the resiliency of the material forming the clip. The leg 43 has secured to it a spacer 45 which lies between the reed 40 and the angle member 39. The spring legs 43 and 44 serves to hold the reed 40 and spacer 45 firmly against the angle member 39 so that vibration of the reed can take place only between the spacer and the end of the reed. This being the case, by moving the clip longitudinally in the slot 42 the vibrational speed of the reed may be changed. In order to hold the clip in a fixed position, a plurality of notches 46 are made in the side of slot 42 for receiving the upper part 47 of the resilient leg 43. Each of these notches is provided with a pair of numbers, those on the upper side thereof (Fig. 5), corresponding to eight cylinder engine vibrations and those on the bottom side of Fig. 5 corresponding to six cylinder engine vibrations. These numbers may be selected to represent either the speed of the automobile or the number of revolutions of the engine. 48 indicates a pair of pointers formed by cutting out a piece of metal of the clip and bending it so that it lies adjacent to the indicating marks of the notches.

In Fig. 8, the speedometer device is shown held in position on the steering column 34 of an automobile, by means of the spring clip 11. In Fig. 9 the device is attached to the dashboard 35 of the car by a U-shaped clamp 36 having a thumb screw 37. In Fig. 10 the indicator 29 is shown fixed to the dashboard 35 and the vibratile reed mechanism is illustrated as attached to the engine block.

In all cases, it is preferable that the device be so mounted that the reed will tend to vibrate in a lateral direction with respect to the car rather than vertically. By so mounting the device vibration of the reed resulting from road shock will be kept so small as to be negligible.

In determining the frequency of a reed to indicate a certain speed of a particular automobile, a number of cylinders in the engine, the gear ratio and size of the wheels must be taken into account. For example, normally, everything else being equal, a reed which would vibrate at twenty miles an hour in an eight cylinder car would vibrate at forty miles an hour in a four cylinder car, there being double the number of explosions per revolution in an eight cylinder engine that there are in a four cylinder engine.

What is claimed is:

1. An automobile speedometer comprising in combination a tuned vibratile reed, means for mounting said reed on a part of said automobile subject to mechanical engine vibrations, in a position for substantial mechanical vibration in a horizontal plane, and an anvil for said reed.

2. A device in accordance with claim 1, wherein an anvil is provided and positioned to be struck by said reed upon vibration thereof.

3. An automobile speedometer comprising in combination a flat tuned vibratile reed, means for mounting said reed in a vertical plane on a part of said automobile subject to mechanical engine vibrations in a position for mechanical vibration, and an anvil located in a horizontally displaced position with respect to said reed and so spaced that it is struck by said reed during the vibration thereof as a result of engine tremors.

4. An automobile speedometer comprising in combination a tuned vibratile reed, means for mounting said reed on the steering column of said automobile subject to mechanical engine vibrations, in a position for substantial mechanical vibration in a horizontal plane, and an anvil for said reed.

5. A combination according to claim 1, wherein the reed extends parallel to the engine crank shaft.

6. A combination according to claim 4, wherein said reed is inserted on and extends parallel to said steering column.

EDWARD D. PHINNEY.